June 2, 1964  F. N. ROTHACKER  3,135,676
MATERIAL TREATMENT METHOD AND APPARATUS
Filed Nov. 8, 1960
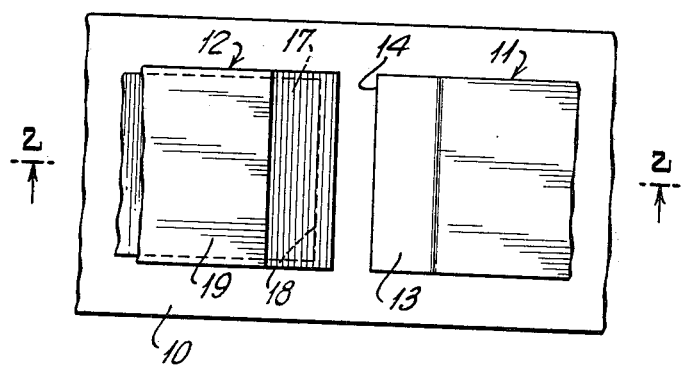
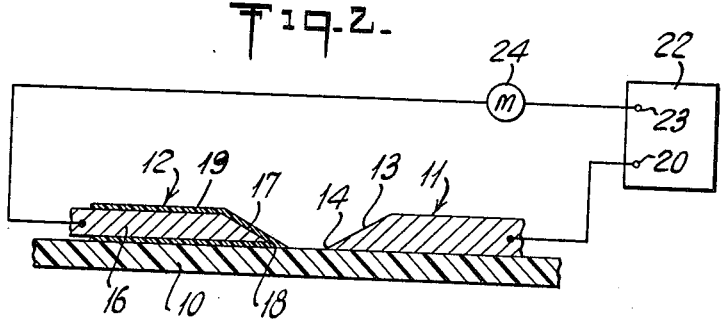
INVENTOR
FRANCIS N. ROTHACKER
BY
William R. Lieberman
ATTORNEY sive and difficult to practice. Polyethylene has been treated by exposing it to a flame but this procedure at best is of limited application, difficult to control and yielding non-uniform results. The polyalkylene resins have been successfully treated by passing a web thereof between a pair of electrodes and establishing a corona discharge between the electrodes. This last process is limited to the treatment of thin webs and in environments where it is convenient to position electrodes along opposite faces of the web. A process which has proven successful in the treatment of various plastic webs consist in passing the web between and in contact with a pair of electrodes, one of which is covered with a high loss dielectric material, and applying a fluctuating voltage to the electrodes. Here again, it is necessary to locate electrodes along opposite faces of the web. It is apparent from the above, therefore, that there is no suitable process available for the treatment of plastic materials wherein the opposite faces thereof are not closely spaced and readily available, such as is the case in containers, solid bodies, tubes, pipes and the like.

United States Patent Office 3,135,676
Patented June 2, 1964

3,135,676
MATERIAL TREATMENT METHOD AND APPARATUS
Francis Neill Rothacker, Orange, N.J., assignor to Sealtron Corporation, Long Island City, N.Y., a corporation of New York
Filed Nov. 8, 1960, Ser. No. 68,071
11 Claims. (Cl. 204—168)

The present invention relates generally to the treatment of materials, and it relates particularly to an improved process for the treatment of synthetic organic plastic materials to enhance properties thereof, and in particular the adherency or receptivity of inks, coatings, laminates, adhesives and the like.

Many of the widely used synthetic organic plastic materials, as typified by the polyalkylene resins such as polyethylene and polypropylene, normally possess surface finishes having very poor adherent properties so that material applied to the faces thereof do form an adequate bond with the plastic material and thus are easily removed as by abrasion or by other actions, or do not become affixed thereto in the first instance. Many processes have been proposed and employed to increase the adherent or receptive properties of organic plastic materials, and while these are more or less effective to such ends, they have had many drawbacks and disadvantages. The various chemical treating processes suggested are expensive and difficult to practice. Polyethylene has been treated by exposing it to a flame but this procedure at best is of limited application, difficult to control and yielding non-uniform results. The polyalkylene resins have been successfully treated by passing a web thereof between a pair of electrodes and establishing a corona discharge between the electrodes. This last process is limited to the treatment of thin webs and in environments where it is convenient to position electrodes along opposite faces of the web. A process which has proven successful in the treatment of various plastic webs consist in passing the web between and in contact with a pair of electrodes, one of which is covered with a high loss dielectric material, and applying a fluctuating voltage to the electrodes. Here again, it is necessary to locate electrodes along opposite faces of the web. It is apparent from the above, therefore, that there is no suitable process available for the treatment of plastic materials wherein the opposite faces thereof are not closely spaced and readily available, such as is the case in containers, solid bodies, tubes, pipes and the like.

It is, therefore, a principal object of the present invention to provide an improved method for the treatment of synthetic organic plastic materials.

Another object of the present invention is to provide an improved method for the treatment of the surface of an article of synthetic organic thermoplastic material whereby to increase the adherent properties and receptivity thereof.

Still another object of the present invention is to provide an improved method for the treatment of the surface of an article of synthetic organic thermoplastic material in order to increase the bonding properties thereof for the reception and retention of inks, laminates, coatings, adhesives and the like.

A further object of the present invention is to provide an improved electrical method for the treatment of a synthetic organic thermoplastic surface to enhance the bonding properties thereof where only access to the particular surface to be treated is necessary, and is thus applicable to articles of any shape or configuration.

Still a further object of the present invention is to provide a process of the above nature characterized by its versatility, flexibility, minimal equipment requirements, low cost and ease of control.

The above and other objects of the present invention will become apparent from a reading of the following description, taken in conjunction with the accompanying drawings, wherein FIGURE 1 is a top plan view of an electrode system employed in practicing the present improved process; and FIGURE 2 is a longitudinal sectional view along line 2—2 in FIGURE 1.

It has been discovered that the surface properties of a synthetic organic plastic material may be altered to increase its adherence and improve its bonding properties by establishing along said surface a potential gradient sufficient to establish an electric discharge along said surface. The electrical discharge should travel along the surface to be treated and may be invisible in nature or may be a corona, brush or other electrical discharge evidenced by a relatively high current density, greater than the normal conductance current of the plastic material. The voltage or potential gradient required to establish the electrical discharge varies in accordance with the material being treated; the ambient atmospheric conditions; the type of voltage employed, that is, whether it is alternating or direct; its frequency; the dimensions, configuration and properties of the electrodes, and many other parameters. However, the voltage necessary to establish a discharge may be readily determined by anyone skilled in the art.

One method for ascertaining such minimum voltage is to connect a sensitive electric current meter in series between the voltage source and the electrodes between which the discharge is to be established under operating conditions. The voltage is then slowly increased or the electrode spacing slowly decreased, and the current noted on the electric meter. The current will concurrently increase very little until the electric discharge is established, at which point there is an abrupt, sharp and large increase in the current which is evidence of such electric discharge. It should be noted that any voltage may be employed which is at least that of the minimum discharge voltage under operating conditions. Of course, it is inconvenient and may lead to damage if such voltage is high enough to cause breakdown and heavy detrimental and burning electrical arcing, such conditions being readily apparent and varying with different conditions. The electric discharge voltage is advantageously between about 1,000 and 10,000 volts.

It has been found advantageous to employ a pair of longitudinally spaced electrodes having confronting relatively sharp transverse edges, at least one of the electrodes being covered or coated with a dielectric or insulating material. The electrode edges preferably rest directly on the surface to be treated or they may be disposed a small distance above the work surface, provided that the established electric discharge travels from the electrodes to the surface and along the surface. Moreover, the voltage employed is preferably of a fluctuating nature or an alternating current, the frequency being from a few cycles per second to hundreds of megacycles per second. The area of the surface treated is delineated by the confronting electrode edges. Thus, by moving the electrodes relative to the work surface or by moving the work surface relative to the electrodes, preferably longitudinally, as much of the surface as desired and which is exposed to the electric discharge may be treated. It should be noted that the intensity of the treatment varies directly with the time of exposure of the plastic surface, as well as with the intensity of the discharge.

Referring now to the drawings, which illustrate an arrangement by which the present process may be practiced, reference numeral 10 represents a thick band or web of a synthetic organic thermoplastic material, the upper or work surface of which is to be treated. Superimposed and resting on the work surface of the plastic band 10 are a pair of electrodes 11 and 12, which may be mounted in any suitable manner and longitudinally adjustable relative to each other. Electrode 11 is formed of metal or of other good electrical conductivity material, and is provided with a transversely extending upper tapered surface 13 which intercepts the underface of the electrode 11 along a sharp discharge edge 14 which contacts the work face of the band 10.

Electrode 12 includes a core member 16 of conducting material and of a configuration similar to that of electrode 11. Core member 16 has a tapered transverse upper border 17 which intercepts the core member underface along a sharp transverse discharge edge confronting and parallel to the discharge edge 14 of the opposite electrode 12. The core member 16 is covered with a thin layer or coating 19 of a dielectric or insulating material. Coating or layer 19 is preferably just thick enough or slightly thicker than that required to prevent the piercing thereof by the electrical discharge at the full range of operating voltages. Such coating may be of polyvinyl chloride, saran, polyethylene or the like.

Electrode 11 is connected to a terminal 20 of an adjustable alternating current high voltage source 22. The other terminal 23 of the voltage source 22 is connected by way of a current meter 24 to electrode 12 by way of core member 16. The voltage source may advantageously and conveniently consist of a step-up transformer, the primary of which is connected by way of a variable autotransformer to a 60 cycle per second electric current outlet.

In employing the above apparatus, the voltage output of source 22 is raised slowly until a discharge is established, as evidenced by a sharp and abrupt rise in the reading of meter 24. The band 10 is then moved longitudinally or transversely relative to electrodes 11 and 12 to extend the treatment of the band surface to the desired area.

The following examples are given merely by way of illustration and are not meant to limit the scope of the present invention.

*Example 1*

Electrodes 11 and 12 were 3" wide and their confronting discharge edges were separated by 1/16". The electrode covering 19 was 7 mil polyvinylchloride film.

The material treated was a band of polyethylene 20 mil thick which was advanced longitudinally beneath and along and in contact with the electrode transverse discharge edges 14 and 18, as illustrated in the drawing, at a rate of 1' per second. Electrodes 11 and 12 were connected to the terminals of a 60 cycle per second, 4,500 volt alternating current source.

The aftersaid treatment resulted in a 3" wide strip of treated surface, that area which was exposed to the discharge between electrodes 11 and 12, which area exhibited a radically increased adhesion to and bonding with conventional inks. For example, a coating of Benson Brothers and Deeny R-400 ink was roller applied to the above treated area and to an untreated area of the same band and allowed to dry. The ink coating applied to the untreated area was readily and easily separated from the polyethylene by the use of "Scotch" brand adhesive tape, whereas the inked and treated surface repeatedly and completely withstood the "Scotch" brand adhesive tape test.

*Example 2*

A 1 mil thick band of polypropylene was treated in the manner of Example 1 employing the same parameters. The results were the same as in Example 1 in that the treated surface withstood the "Scotch" brand adhesive tape test, whereas the untreated surface did not, demonstrating again the effectiveness of the treatment.

*Example 3*

The electrode set-up of Example 1 was employed, and a 600 cycle per second 3,500 volt alternating current applied therebetween. A 1 mil polypropylene band was advanced at the rate of 1' per second longitudinally along the electrodes in the manner of Example 1. Here again, the adhesion of the treated area to ink was greatly enhanced and withstood the "Scotch" brand adhesive tape test.

*Example 4*

A 1 mil thick polypropylene band was treated as in Example 3, except that both electrodes were covered with a coating of insulating material as the electrode 12. The results were the same as in Example 3.

*Example 5*

A 1 mil thick polypropylene band was treated as in Example 3, except the electrodes were spaced 15 mils above the surface of the polypropylene. Here again, the results were substantially the same as in Example 3.

While in the above examples the material treated was polyethylene and polypropylene, the process is applicable to other synthetic organic plastic materials such as other polyalkylenes; to polyesters, for example, polyethylene terephthalate materials (Mylar, Dacron); the polyacrylic resins, modified or halogenated polyalkylene resins; the polyamides; sarans; and other polymers and copolymers. Furthermore, objects of any shape, thickness or configuration may be satisfactorily processed, and the surface treated may be curved or angulated, either convex or concave or flat. In addition, the shape of the electrodes may be shaped to fit the treated surface, as desired, provided that a voltage gradient is established along the work surface to produce an electric discharge therealong, as earlier set forth, the discharge substantially hugging the work surface. Moreover, the discharge should be located along a substantial area as delineated by the confronting edges of the electrodes and this is effected by covering one or both of the electrodes with an insulating material. It is interesting to note that the voltage necessary to establish the discharge is less in the presence of the work surface than in free air.

The treated surface not only forms a superior bond with various inks but also with various laminates, adhesives, decorations of various types, coatings and the like.

While there have been described and illustrated various embodiments of the present invention, it is apparent that numerous alterations, omissions, and additions may be made without departing from the spirit thereof.

What is claimed and desired to be secured by Letters Patent is:

1. The improved method of treating the surface of a synthetic organic plastic material to alter the properties thereof which comprises establishing a high voltage electric potential gradient along and substantially parallel to said surface sufficient to establish an electric discharge therealong.

2. The improved method of treating the surface of a synthetic organic material to alter the properties thereof, comprising disposing a pair of spaced electrodes along and in close proximity to said surface and simultaneously applying a voltage between said electrodes sufficient to establish a high voltage electric discharge which extends in a direction substantially parallel to and substantially hugs said surface between said electrodes.

3. The improved method of treating the surface of a synthetic organic material to alter the properties thereof, comprising disposing a pair of spaced electrodes along and in close proximity to said surface, said electrodes having opposite confronting discharge edges, and applying a voltage between said electrodes sufficient to establish a high voltage electric discharge between said edges which extends in a direction along and in close proximity and substantially parallel to said surface.

4. The improved method of treating the surface of a synthetic organic material to alter the properties thereof, comprising disposing a pair of spaced electrodes along and in close proximity to said surface, said electrodes having opposite confronting discharge edges and at least one of said electrodes having a covering of electrical insulating material, and applying a voltage between said electrodes sufficient to establish a high voltage electric discharge between said edges which extends in a direction along and in close proximity and substantially parallel to said surface.

5. The method according to claim 4, wherein said discharge edges are disposed substantially in contact with said surface.

6. The method according to claim 4, wherein said voltage is fluctuating.

7. The method according to claim 4, wherein said voltage is alternating.

8. The method according to claim 4, wherein said discharge edges are sharp and substantially parallel to each other.

9. The method according to claim 4, including the step of moving the said surface and said electrodes relative to each other in a direction having a component perpendicular to said discharge edges.

10. The method according to claim 4, wherein said synthetic organic plastic material is a polyalkylene.

11. The method according to claim 4, including the step of applying a voltage between about 1,000 and 10,000 volts.

References Cited in the file of this patent

UNITED STATES PATENTS

| | | |
|---|---|---|
| 2,397,615 | Mittelmann | Apr. 2, 1946 |
| 2,810,933 | Pierce | Oct. 29, 1957 |
| 2,859,480 | Berthold | Nov. 11, 1958 |
| 2,894,139 | Magruder et al. | July 7, 1959 |
| 2,923,964 | Plonsky | Feb. 9, 1960 |
| 2,969,463 | McDonald | Jan. 24, 1961 |
| 3,021,270 | Tarbox et al. | Feb. 13, 1962 |
| 3,057,792 | Frohlich | Oct. 9, 1962 |

OTHER REFERENCES

Vosmaer: Ozone (1916), pages 56–59 and 73.